(12) United States Patent
Okuyama et al.

(10) Patent No.: US 10,158,788 B2
(45) Date of Patent: Dec. 18, 2018

(54) IMAGE PROCESSING DEVICE AND IMAGE PROCESSING METHOD

(71) Applicant: FUJITSU FRONTECH LIMITED, Tokyo (JP)

(72) Inventors: Koji Okuyama, Inagi (JP); Ryohei Hayashi, Inagi (JP); Shunji Sakane, Inagi (JP); Tomonari Kato, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 15/429,884

(22) Filed: Feb. 10, 2017

(65) Prior Publication Data

US 2017/0244870 A1 Aug. 24, 2017

(30) Foreign Application Priority Data

Feb. 18, 2016 (JP) .................. 2016-029215

(51) Int. Cl.
*H04N 1/60* (2006.01)
*H04N 1/56* (2006.01)
*G06K 9/00* (2006.01)
*H04N 1/58* (2006.01)

(52) U.S. Cl.
CPC ....... *H04N 1/6086* (2013.01); *G06K 9/00442* (2013.01); *H04N 1/58* (2013.01); *H04N 1/6027* (2013.01); *H04N 1/6072* (2013.01); *G06K 2209/01* (2013.01); *H04N 2201/0081* (2013.01); *H04N 2201/0084* (2013.01)

(58) Field of Classification Search
None
See application file for complete search history.

(56) References Cited

U.S. PATENT DOCUMENTS

| 5,014,123 | A | * | 5/1991 | Imoto | H04N 1/00267 358/506 |
| 5,187,570 | A | * | 2/1993 | Hibi | H04N 1/40012 358/515 |
| 5,555,312 | A | * | 9/1996 | Shima | B60R 1/00 340/937 |
| 6,215,912 | B1 | * | 4/2001 | Shiitani | G06F 3/04845 358/531 |

(Continued)

FOREIGN PATENT DOCUMENTS

JP 2002-342752 A 11/2002

*Primary Examiner* — Madelein T Nguyen
(74) *Attorney, Agent, or Firm* — Greer Burns & Crain Ltd.

(57) ABSTRACT

An image processing device is provided that enables an operator to reduce time and effort, and that enables an image to be read stably without receiving the influence of a shadow generated after calibration. The image processing device includes: a tint component removing unit that removes a tint component from a captured image; a character information removing unit that removes character information from an image obtained by removing the tint component; a dividing unit that performs grouping on the captured image according to a combination of hue and saturation; a calculating unit that calculates, for each group, correction data for correcting the shadow in accordance with an image obtained by removing the character information and an image obtained by grouping; and a correcting unit that corrects the captured image in accordance with the calculated correction data.

4 Claims, 16 Drawing Sheets

(56) References Cited

U.S. PATENT DOCUMENTS

| | | | |
|---|---|---|---|
| 6,215,914 B1* | 4/2001 | Nakamura | H04N 1/3876 348/584 |
| 6,320,578 B1* | 11/2001 | Shiitani | G06T 15/60 345/419 |
| 6,529,630 B1* | 3/2003 | Kinjo | G06K 9/00228 382/118 |
| 6,681,299 B1* | 1/2004 | Shimamura | G06F 11/1064 711/120 |
| 7,006,708 B1* | 2/2006 | Nako | H04N 1/3878 382/217 |
| 7,020,329 B2* | 3/2006 | Prempraneerach | G06K 9/4652 382/164 |
| 9,219,891 B2* | 12/2015 | Nakamichi | H04N 9/04 |
| 9,595,296 B2* | 3/2017 | Sandrew | H04N 9/79 |
| 9,894,340 B2* | 2/2018 | Holub | H04N 9/735 |
| 2001/0007599 A1* | 7/2001 | Iguchi | G06T 5/009 382/274 |
| 2002/0039199 A1* | 4/2002 | Nose | H04N 1/4052 358/3.03 |
| 2003/0002747 A1* | 1/2003 | Zaklika | H04N 1/409 382/260 |
| 2003/0101326 A1* | 5/2003 | Fallah | G06F 12/0215 711/204 |
| 2003/0179398 A1* | 9/2003 | Takano | H04N 1/40 358/1.9 |
| 2004/0081927 A1* | 4/2004 | Maeno | G03C 7/3029 430/505 |
| 2005/0141002 A1* | 6/2005 | Takano | G06T 5/008 358/1.9 |
| 2005/0152613 A1* | 7/2005 | Okutsu | G06T 5/00 382/254 |
| 2005/0185837 A1* | 8/2005 | Takano | H04N 1/4072 382/162 |
| 2006/0041606 A1* | 2/2006 | Sawdon | G06F 17/30613 |
| 2006/0067575 A1* | 3/2006 | Yamada | G06K 9/00456 382/176 |
| 2006/0187477 A1* | 8/2006 | Maki | G06T 11/60 358/1.9 |
| 2008/0086711 A1* | 4/2008 | Ito | G06F 17/5045 716/103 |
| 2010/0265356 A1* | 10/2010 | Takano | G06T 5/008 348/223.1 |
| 2010/0302562 A1* | 12/2010 | Bonnier | H04N 1/6058 358/1.9 |
| 2013/0322747 A1* | 12/2013 | Ozawa | H04N 1/58 382/164 |
| 2014/0112543 A1* | 4/2014 | Nakayama | G06K 9/00791 382/104 |
| 2015/0235080 A1* | 8/2015 | Pan | G06K 9/00442 382/112 |
| 2017/0357851 A1* | 12/2017 | Segalovitz | G06K 9/3233 |

* cited by examiner

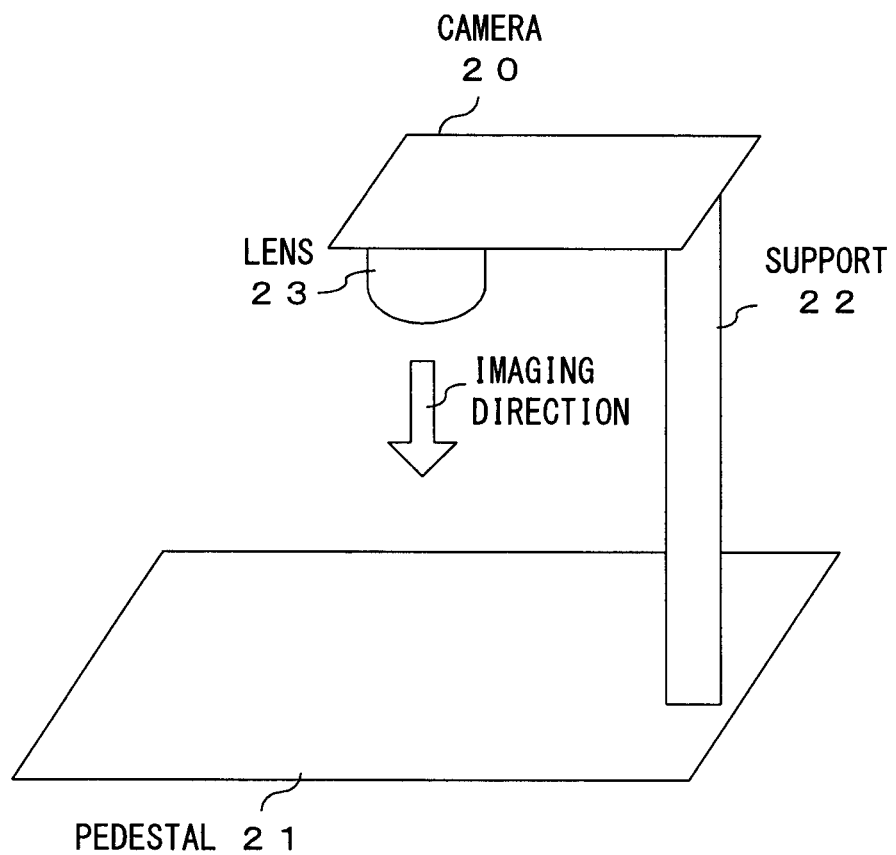
F I G. 2

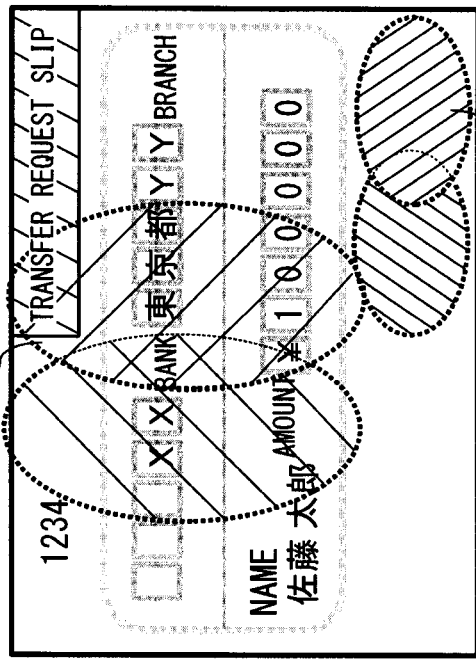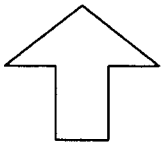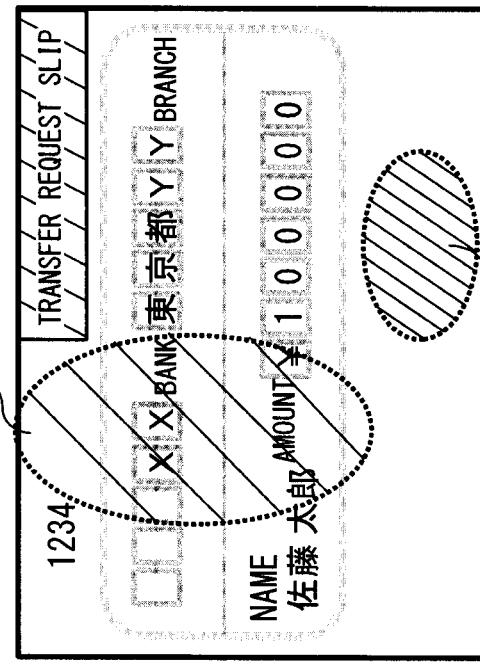
FIG. 3

|  | G1 | G2 | ... | G17 | G18 | G19 | ... | G34 | ... | Gn |
|---|---|---|---|---|---|---|---|---|---|---|
| H | 0~30 | | | | 30~60 | | | | 330~360 | |
| S | 0~15 | 16~30 | ... | 240~255 | 0~15 | 16~30 | ... | 240~255 | ... | 240~255 |

FIG. 10

| GROUP | G1 | | |
|---|---|---|---|
| REFERENCE V VALUE | 200 | | |
| S CORRECTION AMOUNT | | 1.11 | 1.67 | ... |

| GROUP | G2 | | |
|---|---|---|---|
| REFERENCE V VALUE | 200 | | |
| S CORRECTION AMOUNT | | 1.23 | 1.15 | ... |

...

F I G. 1 2

IMAGE PROCESSING DEVICE AND IMAGE PROCESSING METHOD

CROSS-REFERENCE TO RELATED APPLICATIONS

This application is based upon and claims the benefit of priority of the prior Japanese Patent Application No. 2016-02921 filed on Feb. 18, 2016, the entire contents of which are incorporated herein by reference.

FIELD

The present invention relates to an image processing device that removes a shadow that is included in a photographed image.

BACKGROUND

Conventionally, stand-type image readers (stand-type scanners) are used to read media such as business forms used in financial institutions or the like. An image captured by the image reader is converted into electronic data, and the electronized data is used to perform character recognition by principally using image optical character recognition (OCR) or to perform seal impression collation by superimposing seal-impression images onto each other. The image reader does not have a light source, and captures an image by using external light. Therefore, various shadows are included in a captured image according to installation environment. These shadows can be removed by performing calibration (initial adjustment) when the image reader is installed. An example of an image reader that performs the calibration above is disclosed in Patent Document 1 listed below.

Patent Document 1: Japanese Laid-open Patent Publication No. 2002-342752

SUMMARY

According to the present invention, an image processing device is provided that removes a shadow that is included in a captured image. The image processing device includes: a tint component removing unit that removes a tint component from the captured image; a character information removing unit that removes character information from an image obtained by removing the tint component; a dividing unit that performs grouping on the captured image according to a combination of hue and saturation; a calculating unit that calculates, for each group, correction data for correcting the shadow in accordance with an image obtained by removing the character information and an image obtained by grouping; and a correcting unit that corrects the captured image in accordance with the calculated correction data. The tint component removing unit corresponds to the hue/saturation/value-of-color dividing unit described later, the character information removing unit corresponds to the edge removing unit described later, the dividing unit corresponds to the grouping processing unit described later, the calculating unit corresponds to the shadow information generating unit described later, and the correcting unit corresponds to the color shadow correcting unit described later.

In a preferred embodiment of the present invention, the calculating unit calculates, for each of the groups, a reference gradation value that is a maximum value of color of the image obtained by grouping, and calculates a magnification of a gradation value of each pixel with respect to the calculated reference gradation value as the correction data.

In the preferred embodiment of the present invention, the dividing unit selects the combination and performs grouping in accordance with identification information allocated to each medium to be imaged.

According to the present invention, an image processing method performed by an image processing device that removes a shadow that is included in a captured image is provided. The image processing method includes: removing, by a computer of the image processing device, a tint component from the captured image; removing, by the computer, character information from an image obtained by removing the tint component; performing, by the computer, grouping on the captured image according to a combination of hue and saturation; calculating, by the computer, correction data for correcting the shadow in accordance with an image obtained by removing the character information and an image obtained by grouping, for each group; and correcting, by the computer, the captured image in accordance with the calculated correction data.

In the preferred embodiment of the present invention, the computer of the image processing device calculates, for each of the groups, a reference gradation value that is a maximum value of color of the image obtained by grouping, and calculates a magnification of a gradation value of each pixel with respect to the calculated reference gradation value as the correction data.

In the preferred embodiment of the present, invention, the computer of the image processing device selects the combination and performs grouping in accordance with identification information allocated to each medium to be imaged.

BRIEF DESCRIPTION OF THE DRAWINGS

FIG. 2 illustrates an example of a stand-type scanner according to the embodiment.

FIG. 3 is a diagram explaining the influence of a change in an installation location of a stand-type scanner according to the embodiment.

FIG. 10 illustrates an example of a table for grouping performed by a grouping processing unit according to the embodiment.

FIG. 12 illustrates a data table indicating S correction amounts of respective pixels of interest in each group according to the embodiment.

DESCRIPTION OF THE EMBODIMENTS

Figure 1:
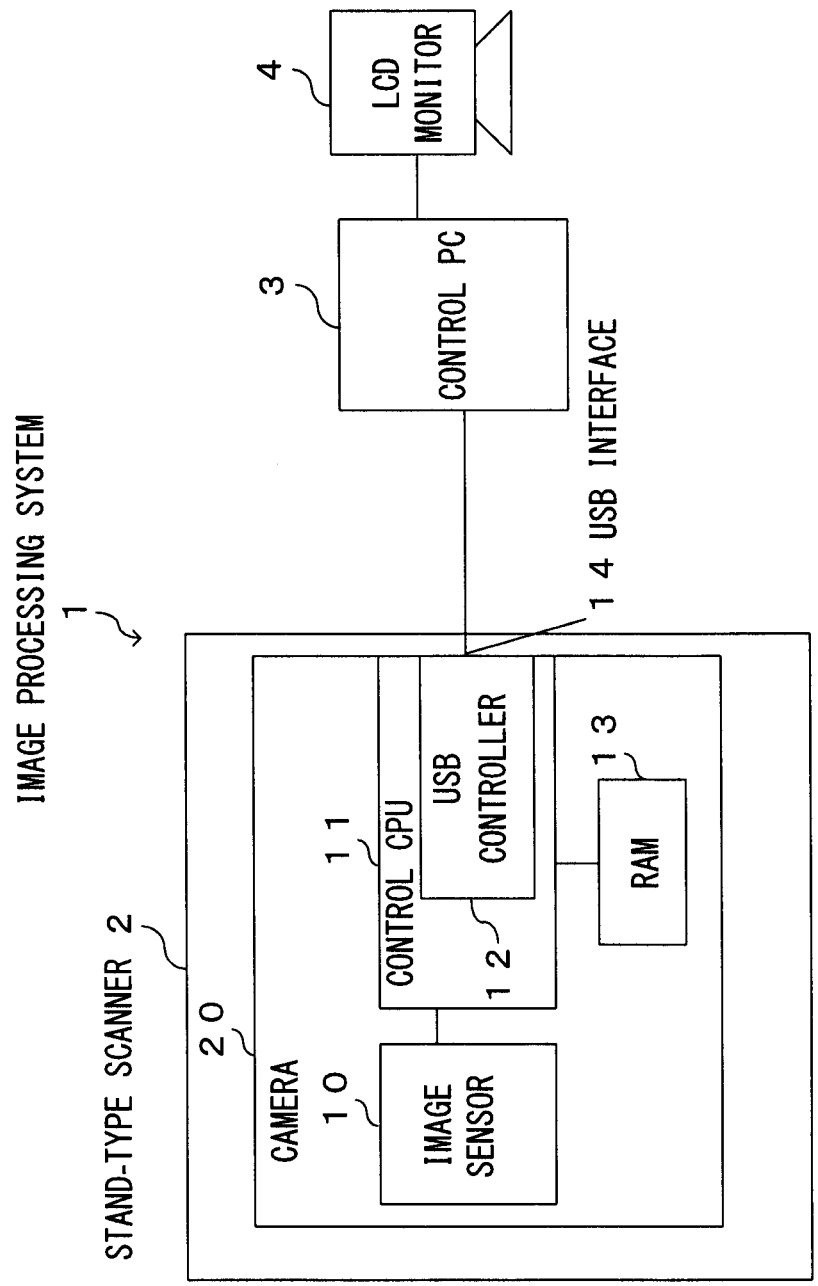
FIG. 1 illustrates an example of the configuration of an image processing system according to an embodiment.

An embodiment is described below with reference to the drawings. An example of an image processing system according to an embodiment is described first with reference to FIG. 1. An image processing system 1 is configured of a stand-type scanner 2 that includes a camera 20, a control PC 3, and a liquid crystal display (LCD) monitor 4. The stand-type scanner 2 and the control PC 3 are connected, for example via a universal serial bus (USB) interface 14.

The stand-type scanner 2 is a non-contact image scanner that reads business forms for tax, public utility charges, or the like, and media that cannot be handled by an automatic-feeder-type image scanner. An example of the stand-type scanner 2 is illustrated in FIG. 2. The stand-type scanner 2 is configured of the camera 20 that includes a lens 23, a pedestal 21, and a support 22.

The camera 20 is configured of an image sensor 10, a control central processor unit (CPU) 11, a USB controller 12, and a random access memory (RAM) 13, as illustrated in FIG. 1. The image sensor 10 includes a color filter of R. G. B, and is an, element that can capture a full-color image. The control CPU 11 controls the entire operation of the camera 20. The USB controller 12 transmits the image captured by the image sensor 10 to the control PC 3 via the USB interface 14 in accordance with an instruction (a control signal) of the control CPU 11. The RAM 13 stores the captured image or the like. The camera 20 may have the function below of the control PC 3.

A medium to be read is placed on the pedestal 21 when the medium to be read, such as a business form, is read. It is preferable that the pedestal 21 be a uniformly black pedestal such that the outline of the medium to be read can be detected while the influence of the transparency of the medium to be read is prevented.

The support 22 supports the camera 20 in such a way that an imaging direction of the camera 20 is perpendicular to the pedestal 21.

The stand-type scanner 2 has a structure in which the camera 20 and the pedestal 21 are separated from each other, and therefore the stand-type scanner 2 can read, for example, thick business forms. In addition, the stand-type scanner 2 does not have a light source, and captures an image by the image sensor 10 of the camera 20 receiving external light, such as fluorescent light, that has been reflected by a medium plane (a plane of a business form).

The control PC 3 specifies and removes a partial shadow from a captured image such that the influence of the collapse of calibration due to a change in an installation location of the stand-type scanner 2 or a temporary shadow (a dynamic shadow) after calibration is alleviated. The control PC 3 corresponds to the image processing device 3 described later, and detailed processing performed by the control PC (the image processing device) 3 will be described later.

The influence of a change in an installation location of the stand-type scanner 2 is described here with reference to FIG. 3. When the installation location of the stand-type scanner 2 is changed after calibration, a shadow 30 after a change in the installation location may be projected onto a business form. In this case, when an operator does not notice a change in the installation location, and performs reading without performing calibration again, a shadow is corrected according to a shadow position 31 that was et at the time of calibration. Accordingly, a portion of the shadow 30 after a change in the installation location that is projected after calibration is not corrected, and remains dark, and the shadow position 31 that was set at the time of calibration is corrected to be bright.

Figure 4:
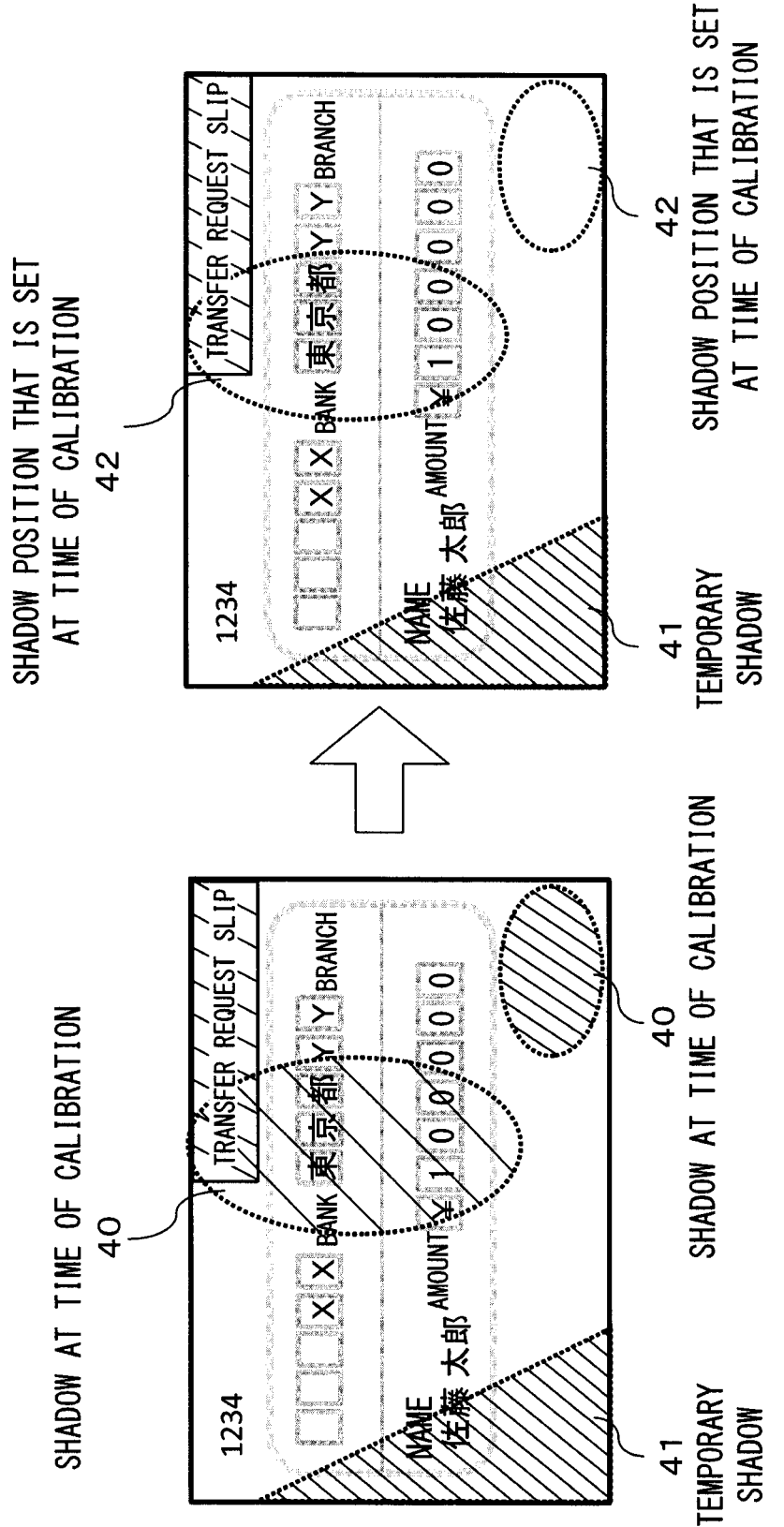
FIG. 4 is a diagram explaining the influence of the collapse of calibration due to a temporary shadow according to the embodiment.

In addition, the influence of the collapse of calibration due to a temporary shadow is described with reference to FIG. 4. When a temporary shadow 41 generated by movement of customer at a counter or a bank clerk in a financial institution after calibration is projected onto a business form, separately from a shadow 40 at the time of calibration, the temporary shadow 41 is not located in a shadow position 42 that was set at the time of calibration, and the temporary shadow 41 is not corrected.

The LCD monitor 4 displays an image obtained by removing a shadow by using the image processing device 3. The LCD monitor 4 may be a component of the image processing device 3.

Figure 5:
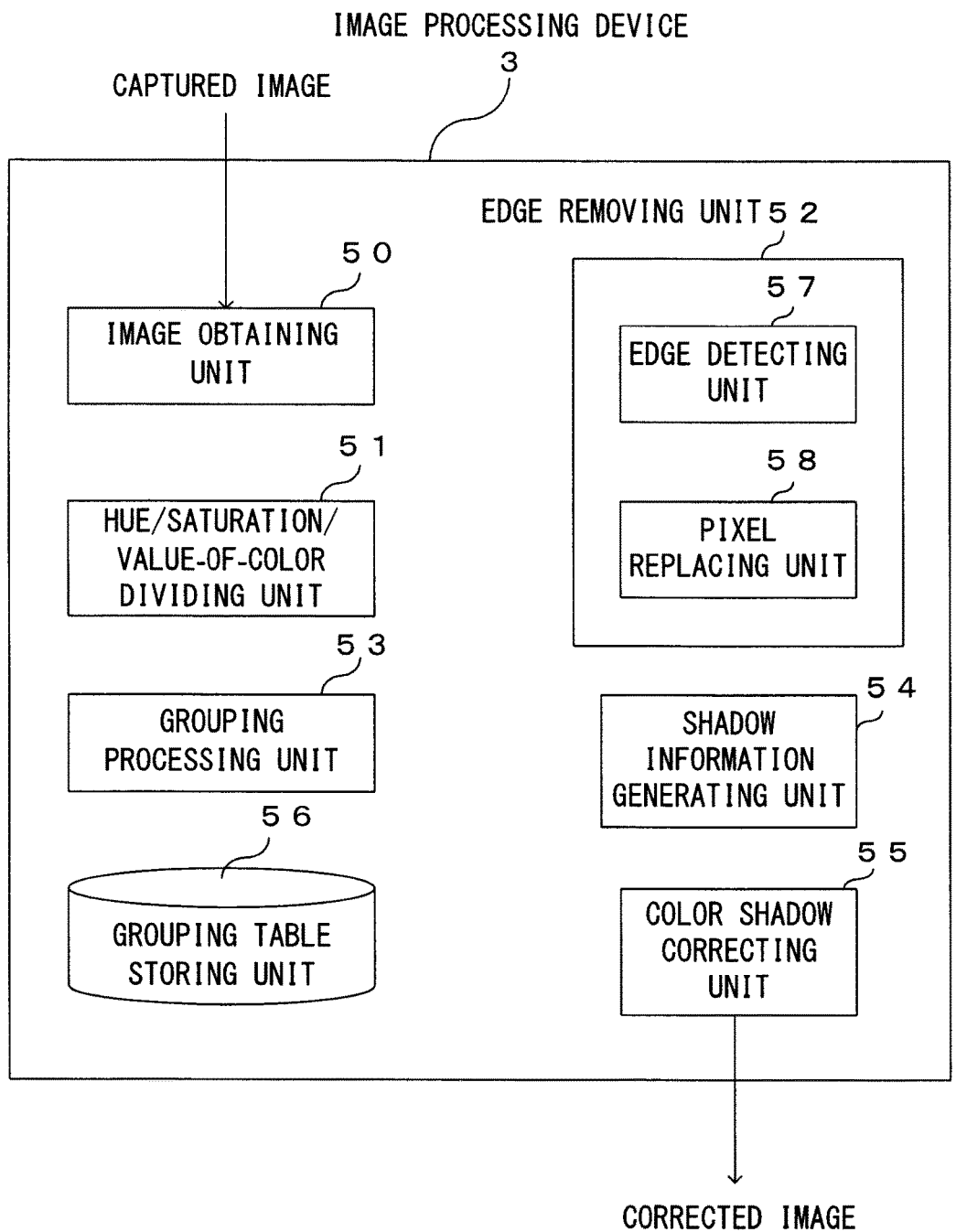
FIG. 5 illustrates an example of the function configuration of an image processing device according to the embodiment.

An example of the function configuration of the image processing device 3 according to the embodiment is described next with reference to FIG. 5. The image processing device 3 is configured of an image obtaining unit 50, a hue/saturation/value-of-color dividing unit 51, an edge removing unit 52, a grouping processing unit 53, a shadow information generating unit 54, a color shadow correcting unit 55, and a grouping table storing unit 56. The configuration of the image processing device 3 is not limited to this, and the image processing device 3 may include other components.

Figure 6:
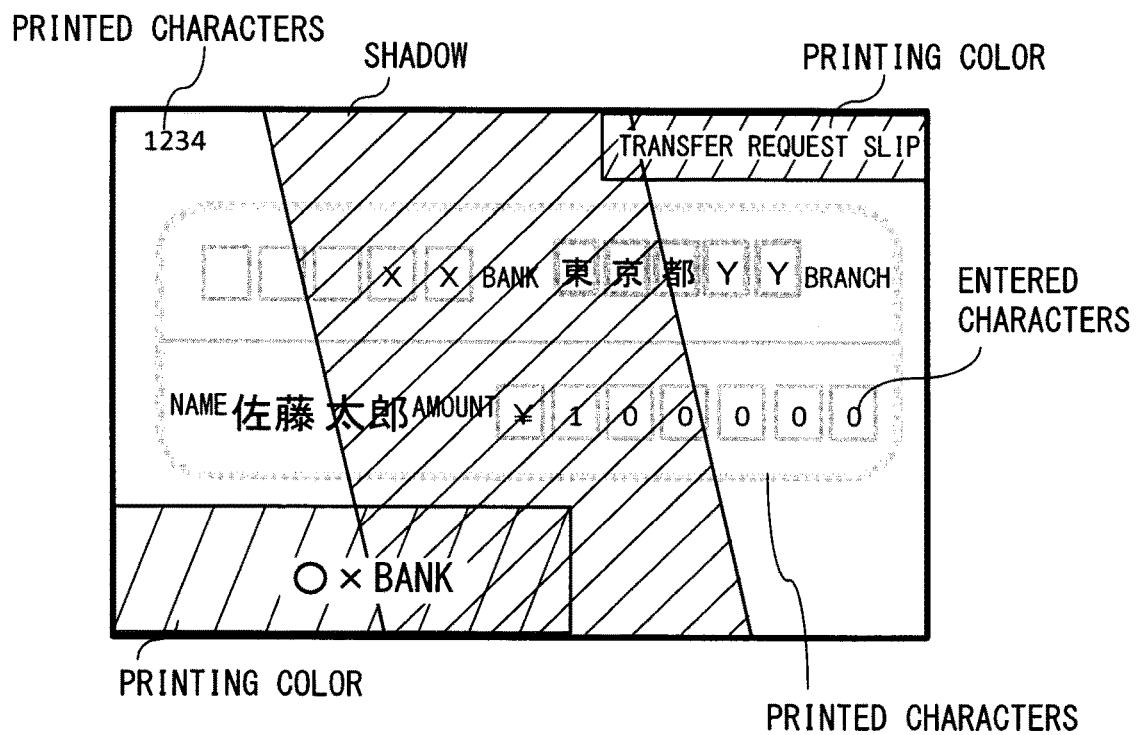
FIG. 6 illustrates an example of a color image according to the embodiment.

The image obtaining unit 50 obtains an image of a medium, such as a business form, that has been captured by the camera 20. The obtained image is, for example, a color image (an RGB image). An example of the color image is illustrated in FIG. 6. The color image of a business form that is illustrated in FIG. 6 includes printing color, entered characters/printed characters, and a shadow.

A target for the printing color is frame lines or guide characters for specifying an entry place, hatching for design, or the like. Color includes a light color and a dark color. The light color is a color for which a value of color is equivalent to that of a white background of medium paper, and the dark color is a color for which a value of color is smaller than that of the white background of the medium paper. In this example, there are only two types of color, the light color and the dark color, but the light color may be divided into a light color and a lighter color, and the dark color may be divided into a dark color and a darker color. The entered characters/printed characters include a seal impression and the like, and are information that becomes a target for OCR recognition or seal impression collation. The shadow is a shadow of the stand-type scanner 2 or a surrounding object that is generated due to a change in an installation location of the stand-type scanner 2 after calibration, or a temporary shadow generated due to movement of a bank clerk or the like.

Figure 7:
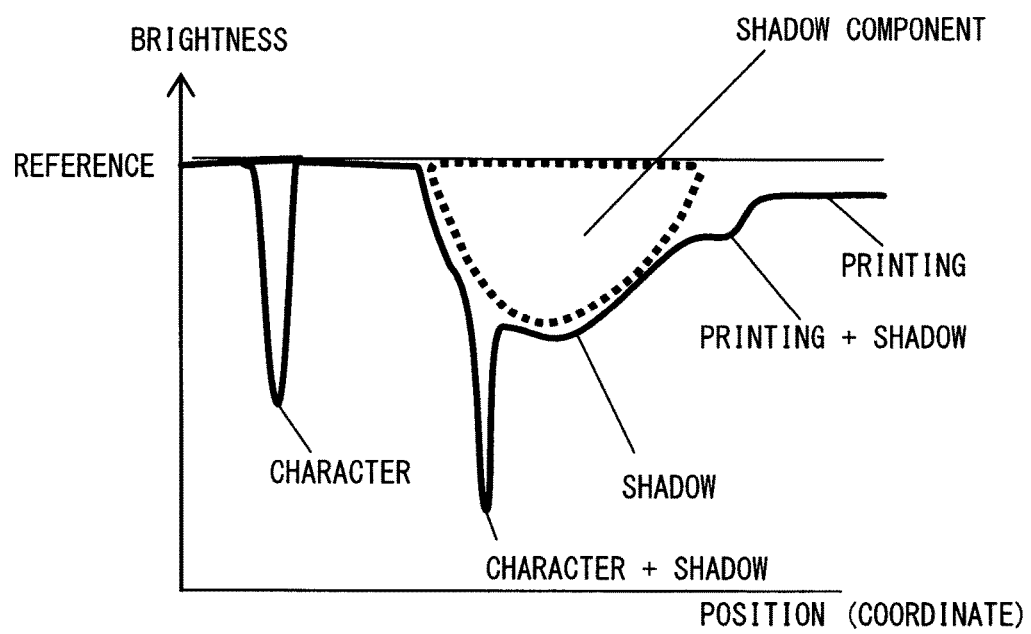
FIG. 7 conceptually illustrates a relationship between a position on a color image and brightness according to the embodiment.

A relationship between a position on a color image and brightness is conceptually illustrated in FIG. 7. FIG. 7 illustrates a brightness of a pixel of an x-coordinate when a y-coordinate is, for example, y=a (a is a constant), in a case in which it is assumed that a horizontal direction of the color image illustrated in FIG. 6 is an X-axis and that a vertical direction is a Y-axis. It is shown that a portion including a character or a shadow has a lower brightness than a reference brightness.

Figure 8A:
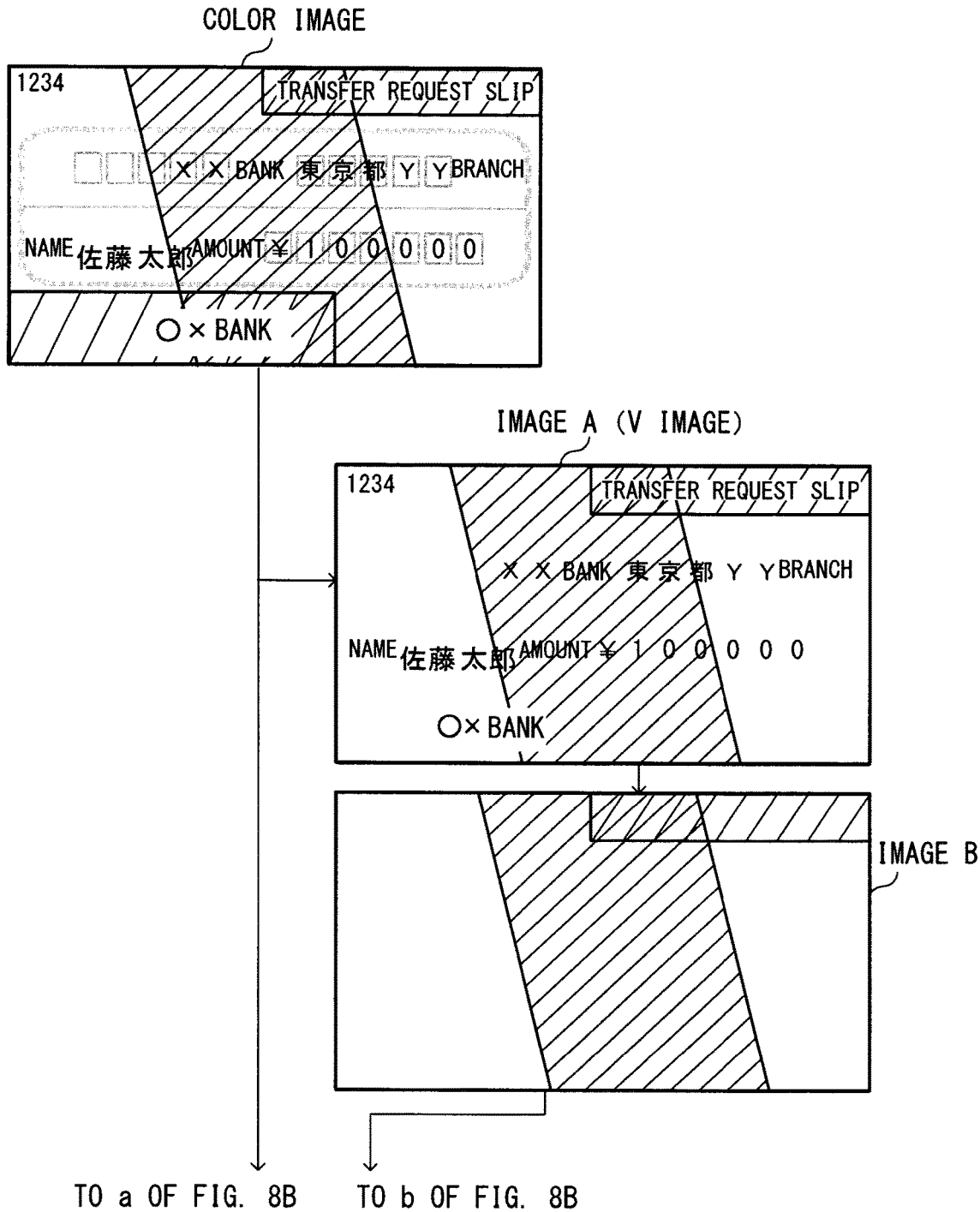
FIG. 8A illustrates an example of an image in each process of shadow removal processing performed by an image processing device according to the embodiment.
Figure 8B:
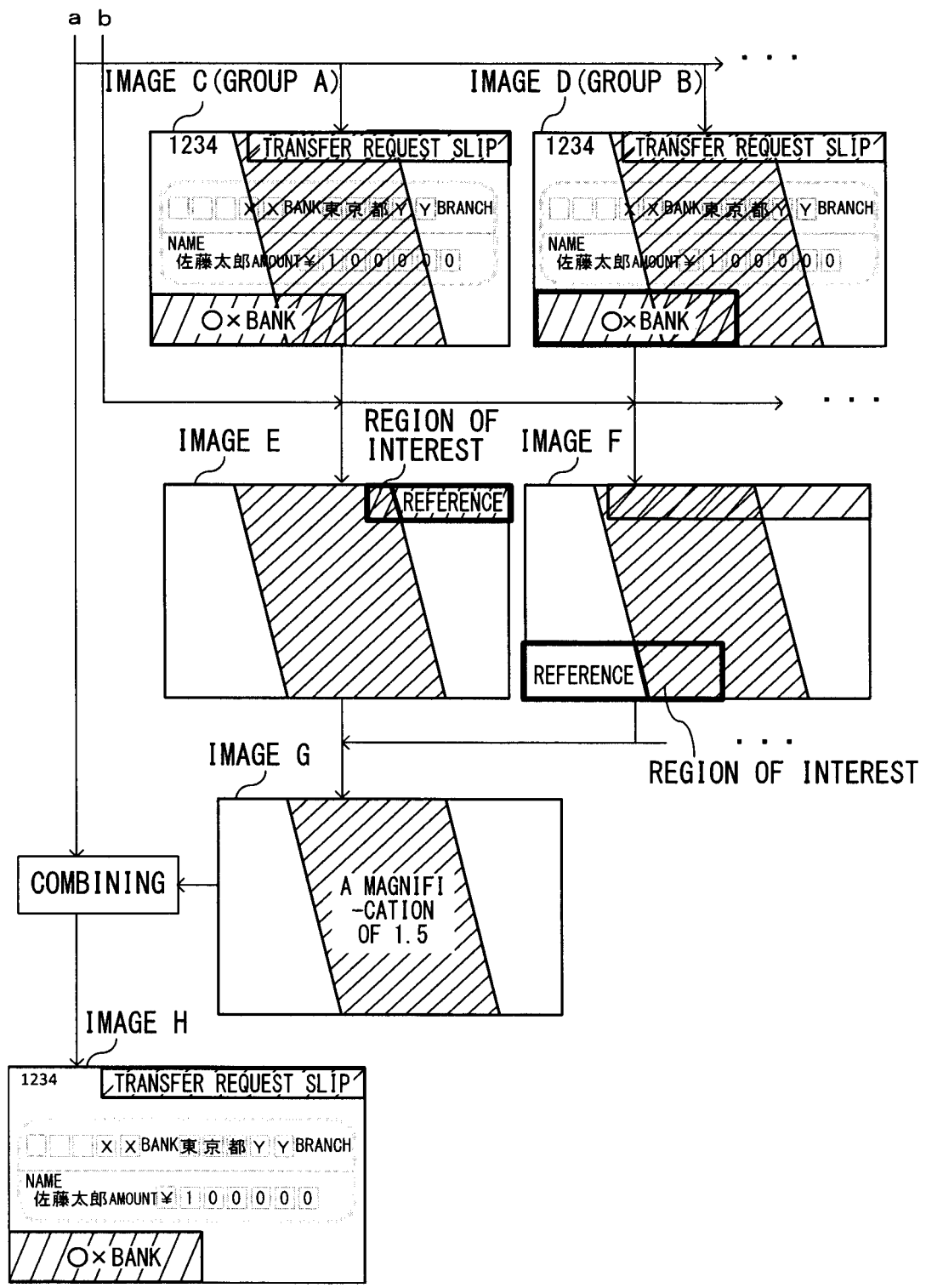
FIG. 8B illustrates an example of an image in each process of shadow removal processing performed by an image processing device according to the embodiment.

The hue/saturation/value-of-color dividing unit 51 converts the obtained color image into an HSV (hue/saturation/value-of-color) color space. The purpose of this conversion is to utilize a feature wherein a shadow does not affect H (hue) and S (saturation) of the HSV color space, and affects only V (a value of color). A converted V (value-of-color) image is an image obtained by removing a tint component H (hue) and S (saturation) from the obtained color image. An example of the V (value-of-color) image is illustrated as image A in FIG. 8A. FIGS. 8A and 8B illustrate an example of an image in each process of shadow removal processing performed by the image processing device 3.

The edge removing unit 52 removes character information (information that becomes a target for OCR recognition or seal impression collation, such as entered characters, printed characters, ruled lines, a seal impression) from the V (value-of-color) image, and the edge removing unit 52 is configured of an edge detecting unit 57 and a pixel replacing unit 58. An example of an image obtained by removing character information from the V (value-of-color) image is illustrated as image B in FIG. 8A.

Figure 9:
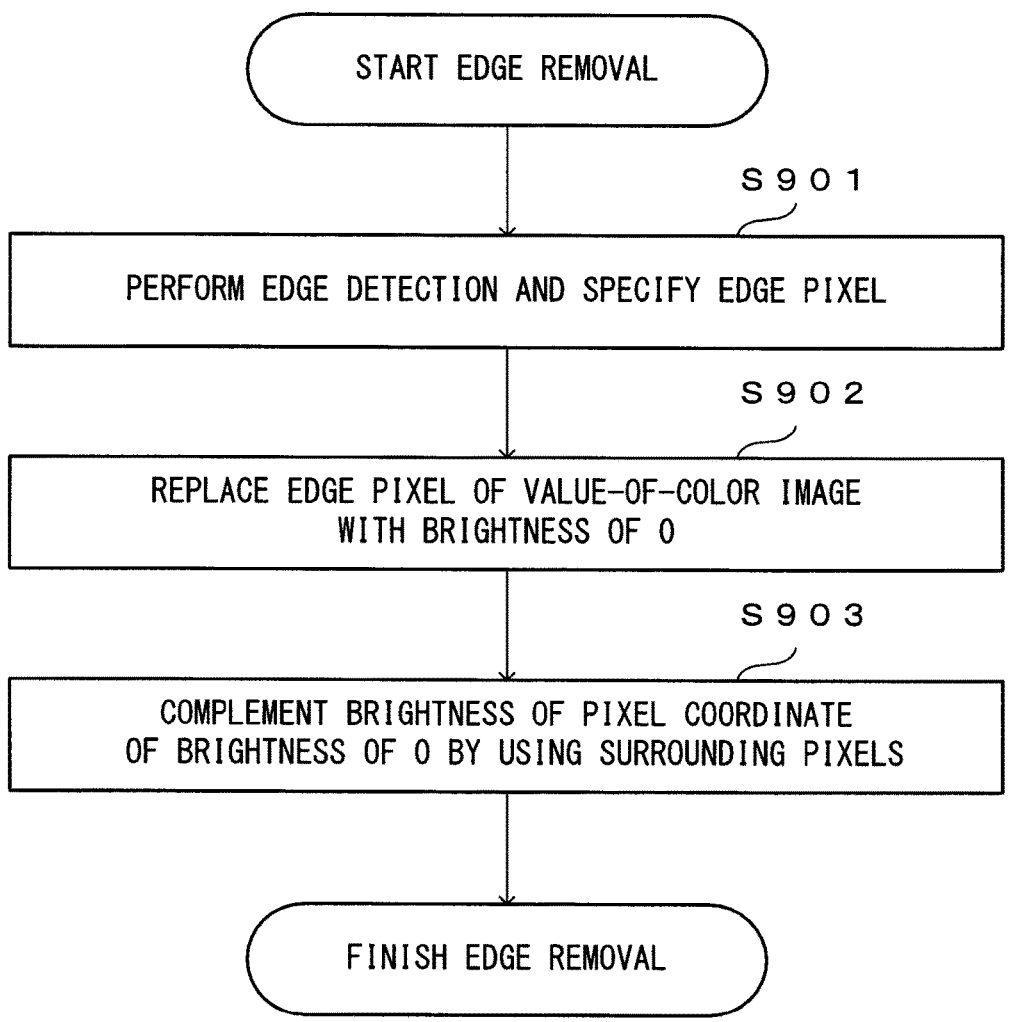
FIG. 9 is a flowchart illustrating an example of the flow of edge removal performed by an edge removing unit according to the embodiment.

Here, an example of the flow of edge removal performed by the edge removing unit 52 is described with reference to FIG. 9. The edge detecting unit 57 performs edge detection processing (for example, processing including binarization) so as to specify an edge pixel (a character portion) (step S901). The pixel replacing unit 58 replaces an edge pixel of the V (value-of-color) image with a brightness of 0 (zero) (step S902). The pixel replacing unit 58 complements a brightness of pixel coordinates of a brightness of 0 by using surrounding pixels (step S903). A pixel having a brightness of 0 is replaced with the closest value of a brightness that is not 0. Specifically, the pixel replacing unit 58 replaces a gradation value of a V (value-of-color) image (a gray scale) that corresponds to a dot position (a pixel of interest) that became "black" as a result of binarization with a neighboring gradation. The neighborhood refers, for example, to a position within a range of 7×7 dots around a pixel of interest. The pixel replacing unit 58 replaces the gradation value with a maximum gradation value within the range. In a case in which all of the dot positions within the range are "black" as a result of binarization, the pixel of interest is set to a maximum gradation value "255".

Figure 13:
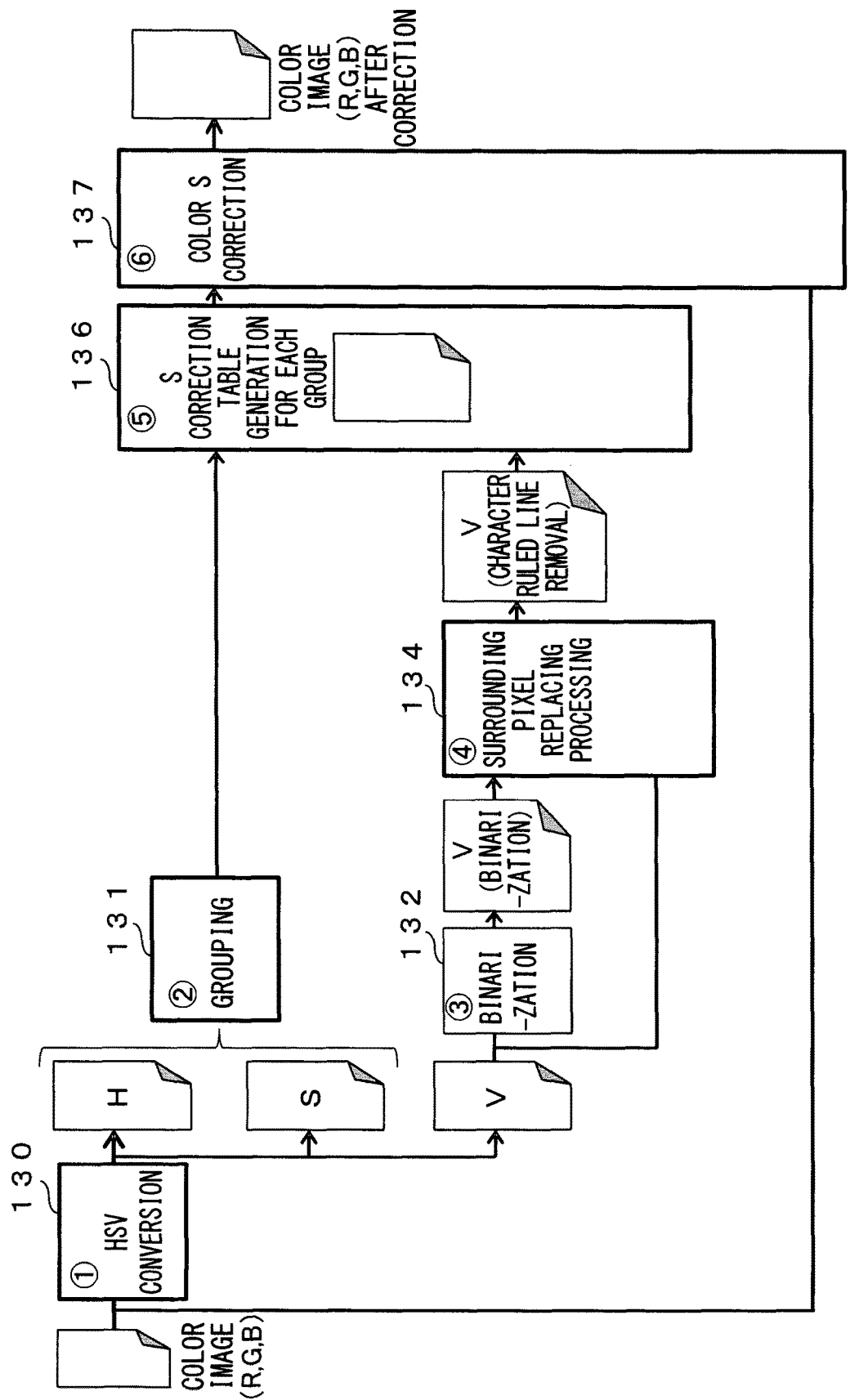
FIG. 13 illustrates the entire flow of shadow removal processing performed by an image processing device according to the embodiment.

The grouping processing unit 53 divides a captured image into groups according to a combination of hue and saturation. Namely, the entirety of the image converted by the hue/saturation/value-of-color dividing unit 51 is divided into groups according to color by using a combination pattern of H (hue) and S (saturation), as illustrated in FIG. 13. An example of a grouping table is illustrated in FIG. 10. As illustrated in FIG. 10, the grouping table includes groups according to a combination of H (hue) and S (saturation). This table is prepared in advance to perform grouping. Group 1 (G1) to Group 17 (G17) have H (hue) of 0 to 30, and Group 1 (G1) has S (saturation) of 0 to 15. According to the table above, as an example, a portion for which H (hue) is within a range of 0 to 30 and S (saturation) is within a range of 0 to 15 gradations is categorized into Group 1 (G1). The fineness of grouping is directly related to the accuracy of removal (correction) of a shadow, and therefore it is preferable that the fineness of grouping can be specified as an external parameter. In addition, the fineness can be determined in image quality evaluation. In this case, groups may not have equal range widths of H (hue) and S (saturation).

The grouping processing unit 53 may perform an optimum grouping on a medium by defining the range widths of H (hue) and S (saturation) for each identification information (ID) of a medium such as a business form and selecting optimum range widths according to the ID of a medium read by performing OCR.

Examples of grouped images are illustrated as image C and image D in FIG. 8B. In these examples, image C (Group A) has a red H (hue) and a high S (saturation), and image D (Group B) has a red H (hue) and a low S (saturation). Group A corresponds, for example, to Group 1 described above, and Group B corresponds, for example, to Group 2 described above. In this example, only two groups are illustrated, but the number of groups is not limited to 2, if there are other types of H (hue) and S (saturation). Color ruled lines are also grouped, but the color ruled lines are omitted in image C and image D of FIG. 8B.

Figure 11:
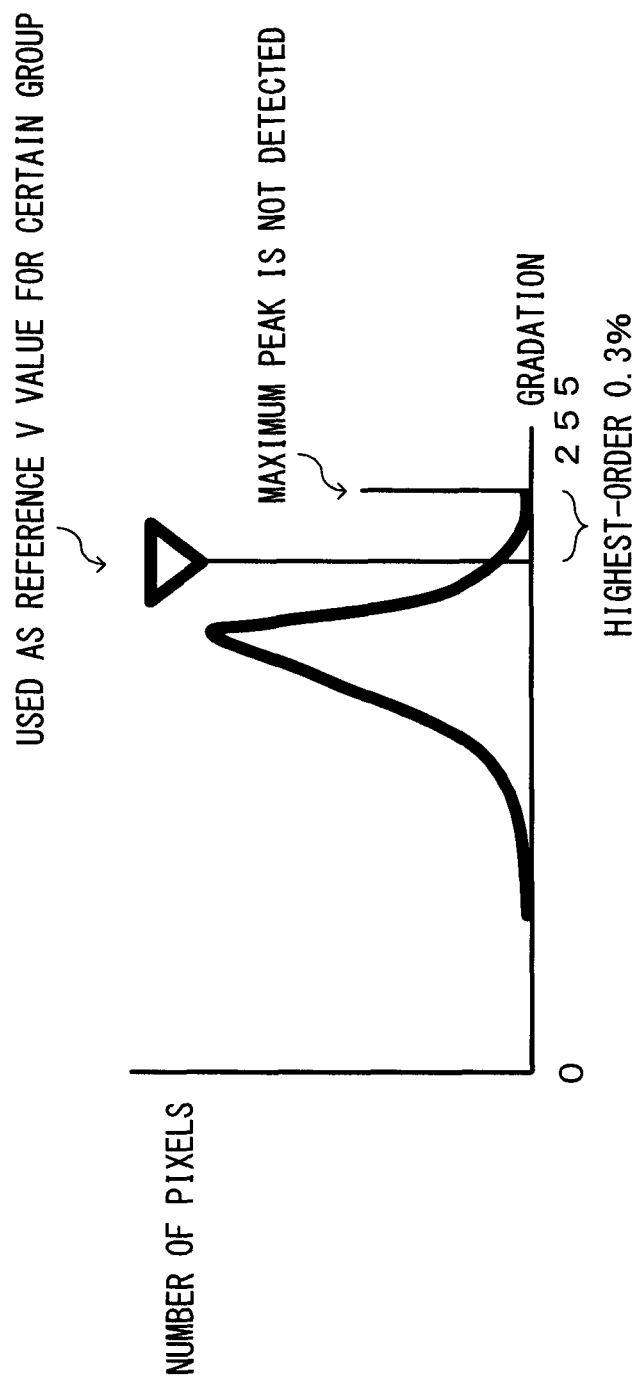
FIG. 11 is a diagram explaining calculation of a reference V value according to the embodiment.

The shadow information generating unit 54 calculates correction data for correcting a shadow according to the image (V image) obtained by removing character information and the grouped image for each of the groups. Specifically, the shadow information generating unit 54 calculates a maximum V (value-of-color) value for an image of each of the groups obtained by grouping. It is assumed that the maximum V value is a reference gradation value (a reference V value) of S (soft) correction. When the maximum V value is simply used as the reference V value, peak noise of an image may be detected, and a value may be unstable. Accordingly, in calculating the reference V value, summation is performed so as to generate a histogram, as illustrated in FIG. 11, for example, and the reference V value is calculated in a state in which the highest-order 0.3% is ignored (99.7% is used as valid data).

The shadow information generating unit 54 calculates a gradation correction amount (hereinafter referred to as an "S correction amount") with respect to a shadow for each of the pixels (pixels that fall under a group) in each of the groups, and the calculated values are tabulated as correction data. The S correction amount is a value obtained by dividing the reference V value by a pixel gradation V value, namely, the magnification of a gradation value of each of the pixels with respect to the reference V value. As an example, in a case in which a reference V value (reference) of Group 1 (for example, Group A in FIG. 8B) is 200 and a gradation value (a gradation V value) of a pixel of interest 1 (one pixel of a plurality of pixels that configure a region of interest illustrated in image E of FIG. 8B) is 180, an S correction amount of the pixel of interest 1 is 1.11 (=200/180). This value (magnification) is used as correction data. However, in a case in which reference V value<pixel gradation V value is established, it is assumed that the S correction amount is 1.

FIG. 12 illustrates S correction amounts of respective pixels of interest that configure a region of interest in each of the groups that have been calculated by the shadow information generating unit 54 in the form of a table. In a table for Group 1 (G1), a reference V value is 200, and S correction amounts of respective pixels of interest are 1.11, 1.67, . . . . A similar table is generated for another group. The shadow information generating unit 54 combines tables generated for respective groups so as to obtain data of the S correction amount (a magnification of XX) for all of the pixels. An S correction amount (a magnification of 1.5) obtained by combining tables generated for respective groups is illustrated in image G of FIG. 8B. A result of grouping may be discarded at the time of tabulation. A limit value of the S correction amount may be determined according to an image evaluation result.

The color shadow correcting unit 55 corrects a captured image according to the correction data (data of the S correction amount) generated by the shadow information generating unit 54, and removes a shadow. Specifically, the color shadow correcting unit 55 multiplies each of the pixels in the image obtained by the image obtaining unit 50 by the S correction amount for all of the pixels such that a color image after correction (image H FIG. 8B) can be obtained.

The grouping table storing unit 56 stores information relating to the tables above generated by grouping, or the like.

The entire flow of the shadow removal processing above performed by the image processing device 3 is illustrated in FIG. 13. As described above, HSV conversion 130 is performed by the hue/saturation/value-of-color dividing unit 51, and grouping 131 is performed by the grouping processing unit 53. Edge removal processing that is configured by binarization 132 and surrounding pixel replacing processing 134 is performed by the edge removing unit 52. S correction table generation 136 for each, of the groups is performed by the shadow information generating unit 54, color S correction 137 is performed by the color shadow correcting unit 55, and a color image after correction is output.

The grouping 131 and the edge removal processing may be performed in parallel, or either of them may be performed earlier. However, the grouping 131 and the edge removal processing need to be completed before the S correction table generation 136 for each of the groups is started.

Figure 14:
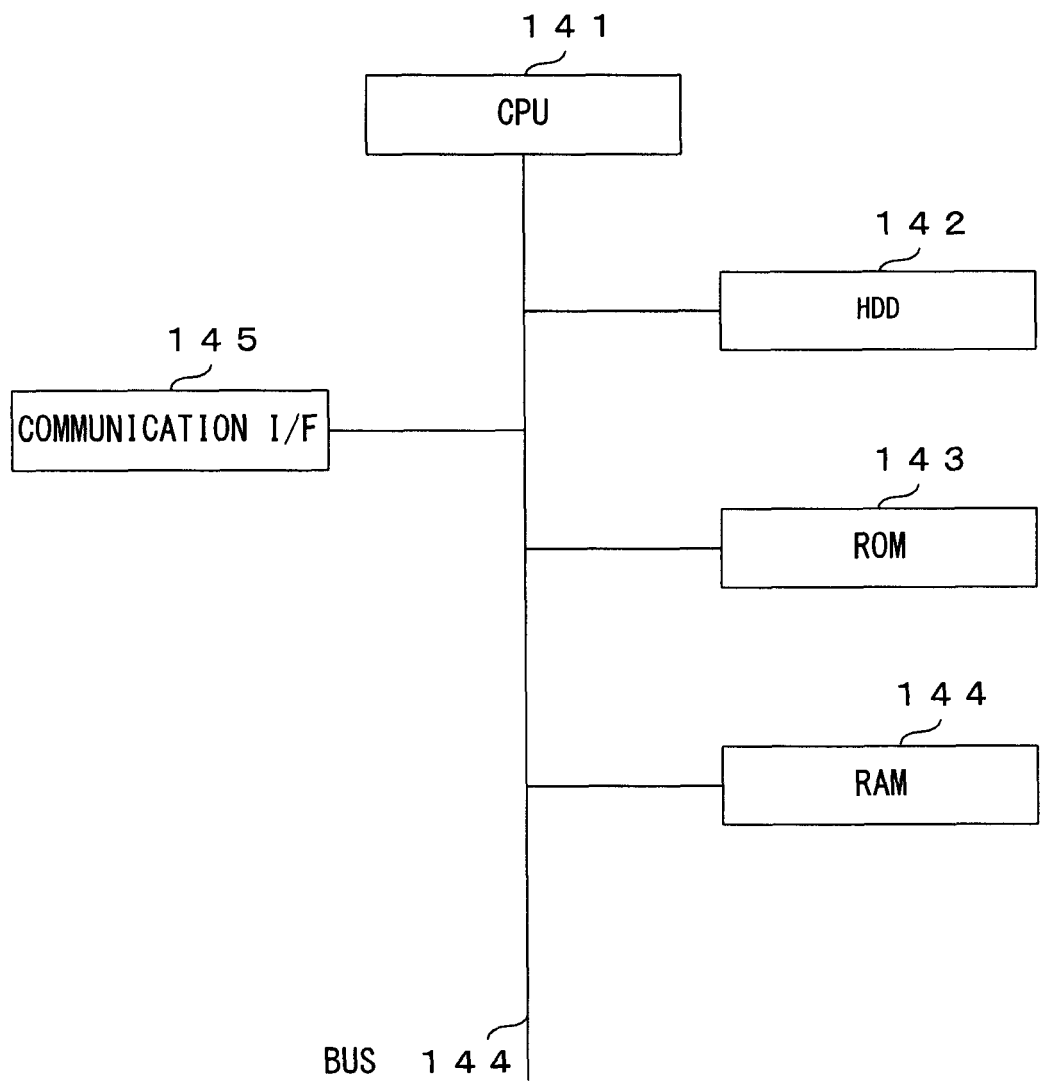
FIG. 14 illustrates an example of a hardware configuration for implementing an image processing device according to the embodiment.

Here, an example of a hardware configuration for implementing the image processing device 3 according to the embodiment is described with reference to FIG. 14. The hardware configuration includes, for example, a CPU 141, a hard, disk drive (HDD) 142, a read only memory (ROM) 143, a RAM 144, a communication interface (I/F) 145, and a bus 146. The CPU 141, the HDD 142, the ROM 143, the RAM 144, and the communication interface (I/F) 145 are connected to each other, for example, by the bus 146.

The CPU 141 reads a program for performing various processing of the image processing device 3 that is stored in the HDD 142 or the like via the bus 146, transitorily stores the read program in the RAM 144, and performs various processing according to the program. The CPU 141 primarily functions as the hue/saturation/value-of-color dividing unit 51, the edge removing unit 52, the grouping processing unit 53, the shadow information generating unit 54, and the color shadow correcting unit 55 described above.

An application program for performing various processing of the image processing device 3, data needed to perform processing of the image processing device, and the like are stored in the HDD 142, and the HDD 142 principally functions as the grouping table storing unit 56 above.

The ROM 143 is a non-volatile memory, and stores a program such as a boot program or a basic input/output system (BIOS).

The RAM 144 is a volatile memory, and a portion of an operating system (OS) program or an application program to be executed by the CPU 141 is transitorily stored in the RAM 144. In addition, various types of data needed for the CPU 141 to perform processing are stored in the RAM 144.

The communication interface (I/F) 145 transmits or receives data to/from the outside (such as the stand-type scanner 2 or the LCD monitor 4), and the communication interface (I/F) 145 principally functions as the image obtaining unit 50 above.

The bus 146 is a path through which a control signal, data signal, or the like is communicated between respective devices.

Figure 15:
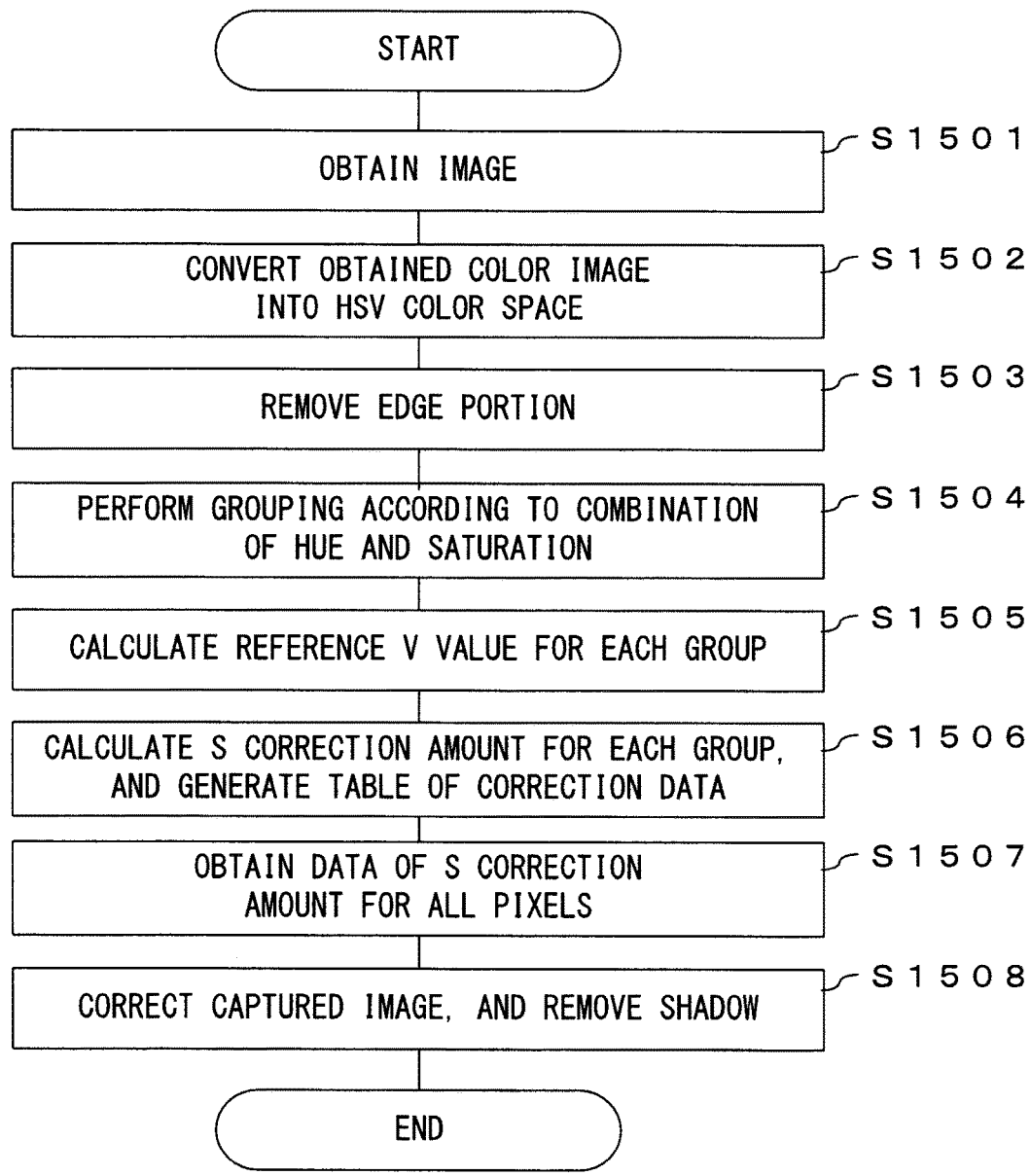
FIG. 15 is a flowchart illustrating an example of the flow of shadow removal processing performed by an image processing device according to the embodiment.

An example of the flow of shadow, removal processing performed by the image processing device according to the embodiment is described next with reference to FIG. 15. First, the image obtaining unit 50 obtains an image captured by the camera 20 (step S1501). The hue/saturation/value-of-color dividing unit 51 converts an obtained color image into an HSV (hue/saturation/value-of-color) color space (step S1502). The edge removing unit 52 removes information (an edge portion) that becomes a target for OCR recognition or seal impression collation, such as character information ruled lines, or a seal impression, from a converted V (value-of-color) image (step S1503).

The grouping processing unit 53 performs grouping on the captured image in accordance with, a combination of hue and saturation (step S1504). At this time, the grouping processing unit 53 may read an ID of a medium to be read by performing OCR, may select range widths according to the ID, and may perform grouping by using the selected range widths, as described above.

The shadow information generating unit 54 calculates a reference V value that is a maximum V (value-of-color) value for an image of each of the groups generated by grouping (step S1505). The shadow information generating unit 54 calculates an S correction amount for all of the pixels in each of the groups, and generates a table by using the calculated values as correction data (step S1506). The shadow information generating unit 54 combines the tables generated for the respective groups, and obtains data of the S correction amount for all of the pixels (step S1507). The color shadow correcting unit 55 corrects the captured image according to the correction data (data of the S correction amount) obtained by the shadow information generating unit 54, and removes (corrects) a shadow (step S1508).

By employing the image processing device 3 above, an operator can reduce time and effort, and an image can be read stably without receiving the influence of a shadow generated after calibration.

In the embodiment above, it has been described that main processing performed the image processing device 3 or the like is performed by the CPU performing software processing. However, all or part of the processing may be realized by hardware.

The embodiment above is not limited to the above, and various modifications can be made without departing from the gist of the embodiment.

What is claimed is:

1. An image processing device comprising a processor that removes a shadow that is included in a captured image of a medium, wherein:
   the processor removes a tint component from the captured image to create a value-of-color image,
   removes character information from the value of color image,
   performs grouping of the captured image according to a combination of hue and saturation to divide the captured image into a plurality of groups,
   calculates, for each group in the plurality of groups, a reference gradation value that is the maximum value-of-color of a grouped image obtained by the grouping, and calculates a magnification of a gradation value of each pixel with respect to the calculated reference gradation value, and
   corrects the captured image in accordance with the magnification of the gradation values to remove the shadow.

2. The image processing device according to claim 1, wherein
  the processor selects the combination of hue and saturation and performs the grouping in accordance with identification information allocated to the medium.

3. An image processing method performed by an image processing device that removes a shadow that is included in a captured image of a medium, the image processing method comprising:
  removing, by a computer of the image processing device, a tint component from the captured image, to create a value-of-color image;
  removing, by the computer, character information from the value-of-color image;
  performing, by the computer, grouping of the captured image according to a combination of hue and saturation to divide the captured image into a plurality of groups;
  calculating for each group in the plurality of groups, by the computer, a reference gradation value that is a maximum value-of-color of the image obtained by the grouping, and calculating a magnification of a gradation value of each pixel with respect to the calculated reference gradation value; and
  correcting, by the computer, the captured image in accordance with the magnification of the gradation values to remove the shadow.

4. The image processing method according to claim 3, wherein
  the computer of the image processing device selects the combination of hue and saturation and performs the grouping in accordance with identification information allocated to the medium.

\* \* \* \* \*